Feb. 19, 1963   B. MALONEY   3,077,956
SELF-CONTAINED BRAKE ARRANGEMENT
Filed April 28, 1960   2 Sheets-Sheet 2
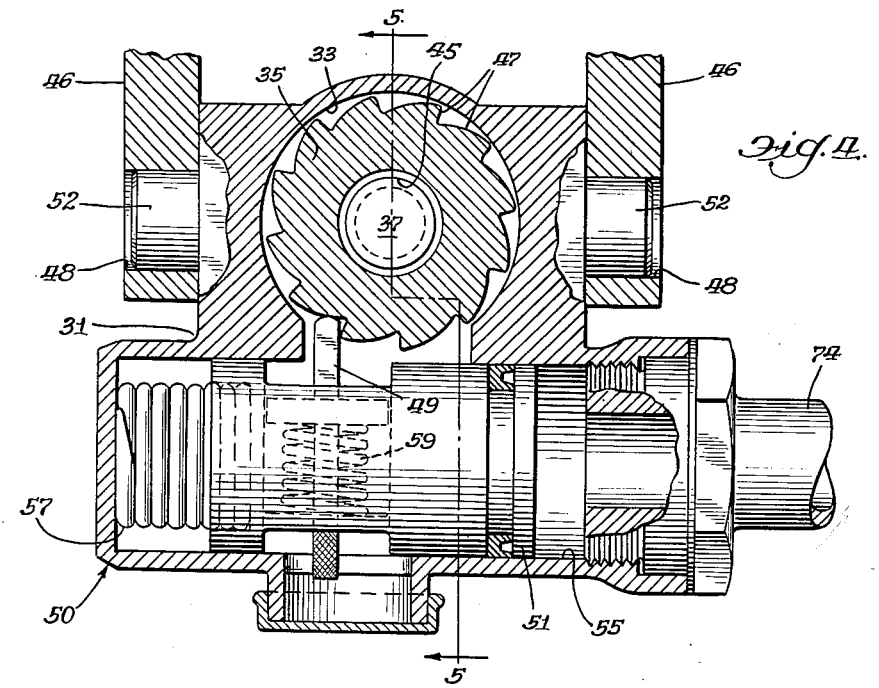
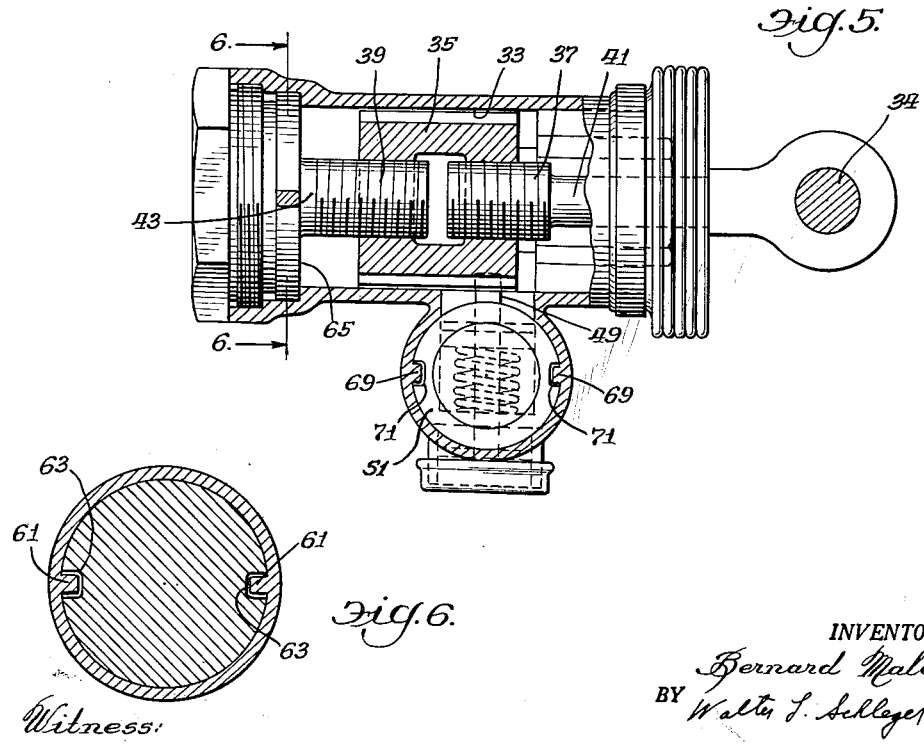
INVENTOR.
Bernard Maloney
BY Walter J. Schlegel, Jr.
Atty.

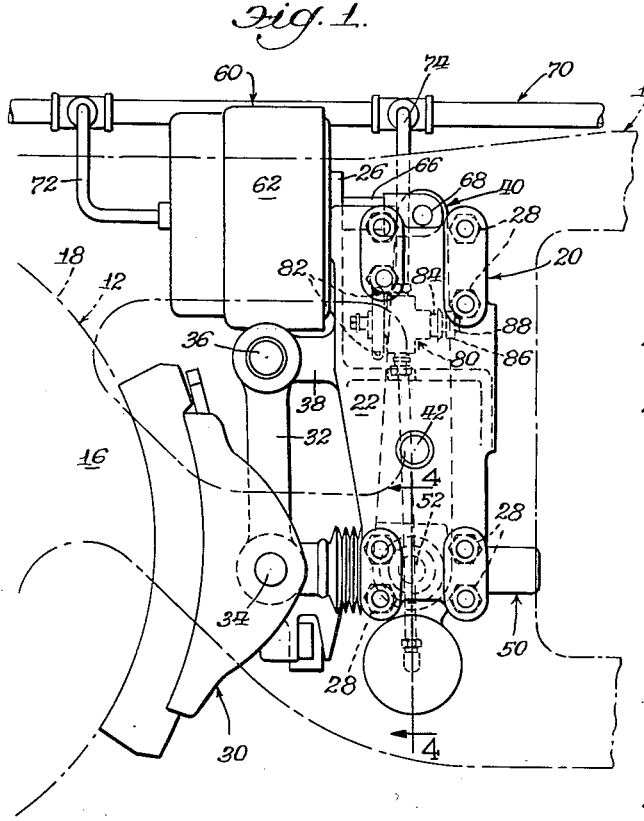

3,077,956
SELF-CONTAINED BRAKE ARRANGEMENT
Bernard Maloney, Gary, Ind., assignor to Amsted Industries Incorporated, Chicago, Ill., a corporation of New Jersey
Filed Apr. 28, 1960, Ser. No. 25,335
2 Claims. (Cl. 188—198)

This invention relates to brakes, and more particularly to a self-contained railway brake arrangement.

The invention comprehends a self-contained brake arrangement of the type disclosed in co-pending patent application Serial No. 751,280, filed July 28, 1958, in the names of Walter R. Polanin and Matthew S. Andrzejewski, wherein the entire brake mechanism is carried by a frame which is detachably mountable on the railway vehicle.

An object of the invention is to provide an improved self-contained brake arrangement that is highly compact and efficient, and also economical from the standpoint of both production and maintenance.

A more specific object of the invention is to provide a self-contained brake arrangement having a fluid actuated automatic slack adjuster that is controlled by a brake lever actuated air valve.

These and other objects of the invention will be apparent from an examination of the following description and drawings, wherein:

FIGURE 1 is a fragmentary side elevational view of a portion of a railway car truck to which has been applied a self-contained brake arrangement embodying features of the invention;

FIGURE 2 is a top plan view of the structure illustrated in FIGURE 1;

FIGURE 3 is an end elevational view of the structure illustrated in FIGURE 1.

FIGURE 4 is a fragmentary cross-sectional view of a portion of FIGURE 1 taken on line 4—4 and looking in the direction of the arrows;

FIGURE 5 is a cross-sectional view of the structure illustrated in FIGURE 4 taken on line 5—5 and looking in the direction of the arrows; and FIGURE 6 is a fragmentary cross-sectional view of a portion of the structure illustrated in FIGURE 5 taken on line 6—6 and looking in the direction of the arrows.

It will be apparent that certain elements have been intentionally omitted from certain views where they are better illustrated in other views.

Referring now to the drawings for a better understanding of the invention, it will be seen that the brake arrangement embodying features of my invention is shown as applied to a railway car truck comprising a frame indicated generally at 10 supported on a pair of wheel and axle assemblies 12 (a portion of only one wheel and axle assembly being shown), each including a wheel 16 presenting a rim or tread surface 18.

The entire brake mechanism is connected to and carried by a preferably unitary brake frame indicated generally at 20, which in turn is detachably mountable on the car truck. As best seen in FIGURE 3, the brake frame is generally H-shaped and comprises a pair of spaced inboard and outboard walls or plates 22 which lie in spaced vertical planes extending longitudinally of the truck. The walls 22 are interconnected intermediate their ends by a preferably integrally formed transversely extending center section 24, and the upper portions of the walls are also interconnected by another integrally formed transversely extending vertical wall 26. Still referring to FIGURE 3, it will be seen that the brake frame is preferably symmetrical about its longitudinal vertical center plane so that it may be detachably mounted on either side of a truck frame by means of a plurality of nut and bolt assemblies 28 which secure the inboard wall 22 to the outboard side of the truck frame.

Deceleration of the wheel and axle assembly is accomplished by means of a brake shoe assembly 30 associated with each brake mechanism and pivotally carried by the brake frame by means of a hanger link 32 pivotally connected at its lower extremity by pin 34 to the brake shoe assembly and pivotally connected at its upper extremity by pin 36 to a lug or pair of lugs 38 projecting outwardly toward a related wheel from the brake frame 20, as best seen in FIGURE 1.

Movement of the brake shoe assembly 30 into and out of engagement with the tread surface 18 of the related wheel is accomplished by means of a generally vertically extending dead brake lever 40 which is fulcrumed intermediate its ends by pin 42 to the center section 24 of the brake frame. As best seen in FIGURE 3, the lever is preferably a double lever having a pair of identical sections 44 which form at the lower end of the lever a bifurcated portion 46 presenting a pair of aligned holes 48 for use in mounting a slack adjuster in a manner hereinafter described.

The connection between the lower end of the brake lever and the brake shoe assembly is achieved by means of a fluid actuated automatic slack adjuster 50 of the type disclosed in patent application, Serial No. 730,353, filed April 23, 1958, now Patent No. 2,974,757, granted March 14, 1961, in the name of Walter R. Polanin. For example, referring to FIGURES 4, 5 and 6, the slack adjuster 50 may be comprised of a housing 31 having a generally cylindrical cavity 33 therein adapted to receive a ratchet wheel 35 which cooperates with threaded portions 37 and 39 of members 41 and 43, respectively, as by means of internally threaded portion 45. A plurality of teeth 47 formed about the periphery of wheel 35 are adapted to be sequentially engaged by resiliently biased indexing member 49 so as to be at times rotated thereby. As the ratchet wheel 35 is rotated, for example, in a counter-clockwise direction, member 41 is caused to move away from member 43 a predictable amount depending, of course, on the degree of rotation of wheel 35 and the pitch of threaded portions 37, 39 and 45. Trunnions 52, formed on housing 31, are received in aligned holes 48 of the brake lever 40 so as to transmit motion from the brake lever to the brake shoe 30 as by means of linkage 41 and pin 34.

Whenever adjustment is required, fluid, which may be air at a relatively high pressure, is admitted to chamber 55, which contains a piston member 51, as by means of conduit 74. As the air is so admitted into chamber 55, piston assembly 51 is caused to move to the left compressing spring 57 and carrying with it the indexing member 49 and upwardly biasing spring 59 which causes member 49 to engage the peripheral teeth 47. When the air pressure is subsequently relieved, spring 57 moves piston assembly 51 and indexing member 49 to the right causing adjustment of member 41 as previously described.

Linkage member 41, by virtue of its connection to pin 34 is prohibited from rotation. However, in order to eliminate rotation of member 43, means such as key portions 61 in housing 31 and cooperating key-receiving slots 63 in the shoulder portion 65 of member 43 may be provided. Any suitable locking means such as nut 67 may, of course, be provided.

Additionally, suitable key and slot portions 69 and 71 may be provided in chamber 55 and piston assembly 51, respectively, so as to insure proper alignment of indexing member 49 with ratchet wheel 35.

Other specific details of the construction of slack adjuster 50, which, of course, form no part of this invention, are disclosed in the aforementioned co-pending application of W. R. Polanin.

Actuation of the brake lever is achieved by means of a power device 60 which may be a conventional fluid actuated power cylinder, or which is preferably a rotochamber comprising a housing 62 detachably mounted on the transverse wall 26 of the brake frame by a plurality of nut and bolt assemblies 64 and having projecting therefrom a push rod 66, the outer end of which is pivotally connected to the upper end of the brake lever 40 by a pivot pin 68. The pressure fluid for actuation of both the power device and the slack adjuster may be supplied from a pressure fluid space (not shown) such as the air line of a train by means of a primary air line 70 having extending therefrom a pair of lines 72 and 74 for connection to the power device and slack adjuster, respectively.

As best seen in FIGURE 3, there is disposed within the line 74 a normally-open slack adjuster shut-off valve 80 which may be detachably secured to the inboard brake frame wall 22 by a plurality of nut and bolt assemblies 82. The normally-open valve 80 is maintained in closed position most of the time by means of a spring loaded plunger 84 which is disposed for engagement by a clip or arm 86 projecting from and secured to the brake lever by a cap screw 88.

To describe the operation of the device, and referring particularly to FIGURE 1, it will be understood that as the power device is energized, the push rod 66 moves to the right causing the brake lever 40 to rotate in a clockwise direction about its fulcrum 42 and thereby carry the slack adjuster and brake shoe assembly to the left and into engagement with the related wheel. As normal wear of the brake shoe occurs and causes slack in the linkage, brake lever arm 86 tends to move away from the valve plunger 84, with the result that the plunger, urged by its spring (not shown), is free to move outwardly a limited distance and open the valve to admit pressure fluid to the slack adjuster from line 74. When this occurs, the slack adjuster automatically functions to lengthen the distance between its respective pivotal connections to the brake lever and brake shoe assembly so as to take up the slack. As the slack is taken up, the upper end of the brake lever returns to its original position and the lever arm again engages and depresses the valve plunger to cut off the flow of pressure fluid to the slack adjuster from line 74. This process is repeated whenever the brake shoe wears to the point where there is slack in the linkage.

I claim:

1. A self-contained brake arrangement for a vehicle having a frame and a supporting wheel and axle assembly, comprising a brake support detachably mountable on said vehicle frame; friction means disposed for engagement with said assembly; a generally vertically extending dead brake lever supported on said support by suitable pivot means; a fluid actuated power device detachably mounted on said support exteriorly thereof and engaged with an upper portion of said brake lever; a fluid actuated slack adjuster interconnecting a lower portion of said dead brake lever and said friction means; first conduit means for at times conveying pressure fluid to said power device; second conduit means for at times conveying pressure fluid to said slack adjuster; valve means serially connected in said second conduit means and rigidly supported with respect to said support and comprising a plunger member resiliently urged toward an open position for the free flow of pressure fluid through said second conduit means and said valve means; and an abutment member formed on said brake lever and adapted to at least at times engage said plunger member; said abutment member and said plunger member being arranged so that during such periods of operation when pressure fluid is not directed to said power device said resiliently urged plunger member is maintained in a closed position by said abutment member while allowing said plunger to be resiliently urged toward the open position whenever said abutment is moved in a direction away from said plunger as during such periods of operation when pressure fluid is directed to said power device for the application of said friction means into engagement with said assembly.

2. In a vehicle brake apparatus having first pressure responsive means adapted to be at times in communication with a source of relatively high pressure fluid for actuation of a friction member through a generally vertically extending dead brake lever in order to apply frictional forces to said vehicle in a manner causing deceleration of said vehicle and second pressure responsive means connected directly to a lower portion of said dead brake lever and said friction member for at times adjusting the relative position of said friction member in order to compensate for the wear incurred by said friction member, the improvement of providing a valve assembly located entirely externally of said first pressure responsive means, said valve assembly comprising a plunger valve member resiliently urged toward an open position, conduit portions serially connecting said valve assembly to said second pressure responsive means and said source of relatively high pressure fluid, and movable abutment means formed on said dead brake lever and effective to move said resiliently urged plunger valve member to a closed position during periods of operation when said first pressure responsive means is not in communication with a source of relatively high pressure fluid while allowing said plunger valve member to be resiliently urged toward said open position during periods of operation wherein said first pressure responsive means is in communication with said source of relatively high pressure fluid.

References Cited in the file of this patent
UNITED STATES PATENTS

| | | |
|---|---|---|
| 696,525 | Wahlert | Apr. 1, 1902 |
| 2,118,236 | Schwentler | May 24, 1938 |
| 2,554,065 | Shields | May 22, 1951 |
| 2,940,553 | Newell et al. | June 14, 1960 |

FOREIGN PATENTS

| | | |
|---|---|---|
| 778,177 | Great Britain | July 3, 1957 |